Aug. 8, 1933. M. TIBBETTS 1,921,552
MOTOR VEHICLE
Filed Jan. 21, 1931
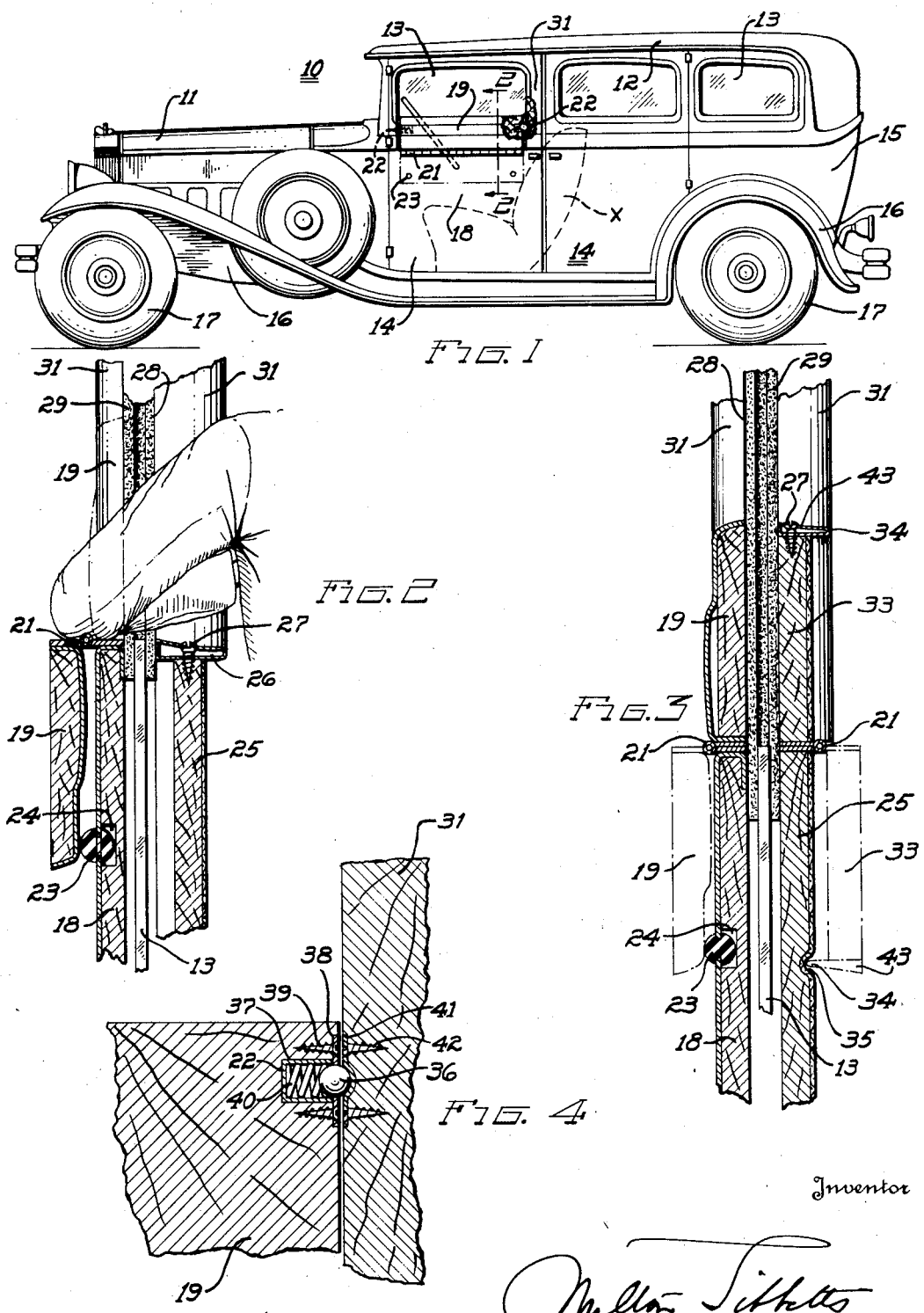
Inventor
Milton Tibbetts Patented Aug. 8, 1933

1,921,552

UNITED STATES PATENT OFFICE 1,921,552

MOTOR VEHICLE

Milton Tibbetts, Detroit, Mich., assignor to Packard Motor Car Company, Detroit, Mich., a Corporation of Michigan Application January 21, 1931. Serial No. 510,117

14 Claims. (Cl. 296—44)

This invention relates in general to motor vehicles and more particularly to vehicle bodies.

In automobile design it is desirable to have a long, low appearance, and in some cases this has been enhanced by narrowing the windows vertically, thus making them relatively longer horizontally. In doing this, and in lowering the seats as has been done in some cases, the occupants of the vehicle have been getting lower and lower relative to the window ledges with the result that the driver, for instance, can no longer rest his arm on the adjacent window ledge to give him a restful variation in driving positions.

One of the objects of the present invention is to restore to the driver or other occupant of the vehicle the convenience of the low window ledge, while at the same time retaining the long, narrow window shape, or even permitting the use of narrower windows than heretofore.

Another object of the present invention is to provide a vehicle body having narrow window openings and high side walls, with a section which may be moved so as to allow an occupant to conveniently rest his arm on the window ledge or sill.

Another object of this invention is to provide an automobile body having a long, low appearance with a movable section which will permit an occupant to extend his elbow or arm through the window opening and rest the same on a sill at a comfortable angle.

Other objects and advantages will become apparent from a reading of the specification and appended claims taken in connection with the accompanying drawing, in which:

Fig. 1 is a side elevational view, with a portion broken away, of a closed type of automobile, showing the adjustable window sill of this invention in connection with the front door beside the driver's seat.

Fig. 2 is a view, partly in section and partly in elevation, of the door panel taken substantially along the line 2—2 of Fig. 1.

Fig. 3 is a similar view of a modification of the present invention.

Fig. 4 is an enlarged sectional view of the latch mechanism shown in the broken away portion of Fig. 1.

In the drawing a conventional type of closed automobile indicated generally at 10 is provided with the usual hood 11, top 12, sliding windows 13, front and rear doors 14, rear quarter panels 15, fenders 16 and wheels 17. An outline of the front seat is shown in dotted lines at X in Fig. 1. The body shown in the drawing is designed to appear both long and low. It will be noted that in this type of body the windows are both long and narrow with the sill line of the window openings elevated beyond a point where an occupant may conveniently rest his arm on the window sill as was possible with previous types of bodies where low appearance was not an effect to be particularly desired.

In the present invention, the left front or driver's door panel 18 is provided with a panel portion 19 which extends across the lower portion of the window opening and can be moved therefrom to enlarge the window opening downwardly. The adjustable panel 19 is secured to the lower door panel 18 by a series of hinges 21 of the concealed type and is adapted to be swung outwardly and downwardly into a position as shown in broken lines. The adjustable panel 19 is provided at either end with a latch 22 to be hereinafter more fully described.

When the occupant wishes to extend his elbow or a portion of his arm out of the window and rest it on the window sill, the hinged sill 19 may be readily swung downwardly in parallel relation with the outer door panel 18, as shown in full lines of Fig. 2. To prevent the hinged section 19 from bumping against the panel 18 when it is in its folded position, rubber grommets 23 are provided in recesses 24 in the fixed door panel 18. These rubber grommets comprise an inner and outer resilient flange and are adapted to be forced into restricted openings in the recess 24 until the inner flange is fully on the inside, leaving the outer flange on the outside of the panel 18. The outwardly protruding portion of the grommets 23 will act as a bumper for the hinged sill 19.

In the preferred embodiment of the invention, the inner wall 25 is shortened below the window opening to a height corresponding to the sill of the fixed main panel. This construction allows a full, wide ledge for the arm to rest upon when the window is down and when the outer hinged panel is folded down, or it provides a substantial ledge when the window is up and the outer sill is in its normal position.

The lower horizontal window molding 26 is secured to the upper edge of the wall 25 by means of screws 27. The usual window glass channel 28 and felt or rubber binding 29 is provided around the inner edges of the window frame 31 which supports the movable window glass 13.

In the modification shown in Fig. 3 the construction of the outer panel is the same as that heretofore described, but in this instance the inner wall 25 is arranged to extend upwardly to the same height as the movable outer panel 19 in the opening in the main panel and is hinged to the lower portion of the wall in the same manner as the outer hinged panel 19. In this embodiment the lower horizontal section 43 of the window finish molding is separable from the remaining sections thereof surrounding the window opening and is attached to the upper side of the inner hinged section 33 of the wall 25 in the same manner as the molding 26 in the preferred embodiment.

The lip 34 of the window finish molding 43 extends inwardly from the hinged wall 33 a greater distance than the distance between the lower inner wall and the upper hinged wall section 33 when the hinged section is in its folded position parallel to the lower inner panel 25. A horizontally disposed recess 35 is therefore provided in the lower inner wall 25 to receive this lip 34 when the hinged section is in its folded position, so that the section will not protrude into the interior of the car, but will lie in parallel relation to the lower section. The recess 35 may be provided with a rubber or felt lining so as to prevent the scarring or rattling of the molding 26.

In the enlarged view of Fig. 4 the latch means 22, which is designed to maintain the hinged sections in their upright positions relative to the door, is shown. This latch comprises a ball 36 which is held over the mouth of a horizontally disposed recess 37, which is provided in the ends of the hinged panel, by a plate 38 having an opening therein slightly smaller in diameter than the diameter of the ball 36. The plate 38 is secured to the hinged sections 19 or 33 by means of screws 39. The ball 36 is pressed outwardly by a spring 40 which is also provided in the recess 37. The door frame 31 is provided with a small metal plate 41 having a depression therein which coincides with the ball 25 which it is adapted to receive, and is secured to the window frame 31 by screws 42.

Normally, in the preferred embodiment shown in Fig. 2 the hinged panel portion 19 is in its upright, vertical position and latched to the door frame 31 and the window glass 13 is also raised. With the parts in this position the driver may rest his elbow on the inner sill 26 and drive in comparative comfort. However, when the window is all the way down, if the driver desires to rest his arm partially out of the window, he merely presses outwardly on the inner side of the hinged panel 19. This pressure will press the ball 36 inwardly against its spring 40 releasing the panel and allowing it to drop outwardly and downwardly to a parallel position relative to the main door panel 18. If he desires to again close the car he merely reaches down with his hand and pulls the hinged panel 19 back to its original position, the spring pressed ball 36 automatically securing it in place.

In the modification shown in Fig. 3 when it is desired to rest the arm partially out of the window, it will be necessary to pull the inner hinged wall section 33 inwardly and downwardly as well as to swing the outer panel 19 down. When the inner hinged wall 33 drops, the lip 34 of the window finish molding 26 will engage the recess 35 and rest therein.

It will be seen that by the present invention a simple and efficient means has been provided whereby the driver or other occupant of an automobile may, at his option, quickly and easily lower the window sill of his car so that he may rest his arm out of the window with ease and comfort, and the preferred construction also provides a substantial ledge which forms a convenient arm rest on the inside of the car when the window is closed.

It will be quite apparent that the invention as shown is susceptible to numerous changes in construction and design without departing from the spirit or scope thereof. For example, the adjustable sill portion 19 could be very easily adapted to telescope within the outer panel 18 or the inner hinged portion 33 of the modification shown in Fig. 3 may be adapted to form a wide arm rest on the interior side of the door rather than to be folded parallel to the lower inner panel. The movable sections 19 and 33 may also be entirely separable from the main panels 18 and 25.

Other changes and modifications will become apparent to one skilled in the art and it is therefore my intention to be limited only by the appended claims.

Having thus described my invention, what I claim and desire to secure by Letters Patent is:

1. In a motor vehicle body structure, fixed inner and outer parallel side walls having a window opening therethrough, walls hinged to said fixed walls and adapted to be swung into or out of the lower portion of the window opening and to extend in a plane parallel with the fixed walls in either position.

2. In a motor vehicle body structure, fixed inner and outer parallel side walls having a window opening therethrough, walls hinged to said fixed walls and adapted to be swung into or out of the lower portion of the window opening and to extend in a plane parallel with the fixed walls in either position, and latch means for securing said hinged walls in position in the opening.

3. In a motor vehicle body structure, fixed inner and outer side walls having a window opening therethrough, a movable wall hinged to the outer fixed wall and adapted to be swung into and out of the lower portion of the window opening and to extend in a plane parallel with the fixed walls in either position.

4. In a motor vehicle body structure, inner and outer side walls having a window opening therethrough, the sill of the opening through said inner wall being adapted to conveniently accommodate the arm of a passenger seated in the adjacent seat, and the sill portion of the opening in the outer wall normally lying in a higher vertical plane than the inner sill portion but being movable to lie flush with said inner sill portion.

5. In a motor vehicle body structure, a fixed wall having a window opening therethrough, said fixed wall forming a window sill, a wall section associated with the fixed wall and movable into and out of the window opening for varying the size thereof, and stop means limiting the extent of movement of the movable section, the uppermost surface of said section extending in substantially the same lateral plane with the sill portion of the fixed wall when moved into position out of the window opening and against the stop means.

6. In a motor vehicle body structure, inner and outer separated walls forming a window pocket therebetween, movable window ledge means associated with the wall on one side of the pocket, and a window slidably mounted in said pocket for movement in either direction past said ledge means in every position thereof.

7. In a motor vehicle body structure, inner and outer separated wall members co-operating to form a window pocket and a fixed window sill, movable means associated with the members to move the sill level of both members to a spaced position parallel to their fixed positions, and a window slidably mounted between said members and movable past said movable means in either of the extreme positions of the latter.

8. In a motor vehicle body structure, a double wall having a window pocket and a window movable therein, the combination with movable ledge means on one side of said pocket, of means associated with the walls to maintain said movable means out of the path of said window while the top of said window is below the top of said movable ledge.

9. In a motor vehicle body structure, inner and outer separated walls forming a window pocket therebetween, a window slidable in said pocket, one of said walls being appreciably higher than the other and the top of the lower wall forming an arm rest, and means at all times preventing said walls from moving into the path of said window.

10. In a motor vehicle body structure, inner and outer separated walls forming a window pocket therebetween, a window slidable into and out of said pocket, there being no part of either of said walls extending or adapted to extend into the path of said window so that the window may have unobstructed movement, one of said walls being appreciably higher than the other and the top of the lower wall forming an arm rest.

11. In a motor vehicle body structure, inner and outer separated walls forming a window pocket therebetween, a window slidable into and out of said pocket, there being no part of either of said walls extending or adapted to extend into the path of said window so that the window may have unobstructed movement, the outer wall being appreciably higher than the inner wall for outside appearance sake and the top of the lower inner wall forming an arm rest.

12. In a motor vehicle body structure, a wall having a window opening therethrough, said wall forming a window sill, a panel section associated with the wall and movable into or out of the lower portion of the window opening for varying the size thereof, said section forming the sill portion when in position in the window opening and forming a coplanar lateral extension of the sill portion of the wall when in position out of the window opening.

13. In a motor vehicle body structure, a wall having a window opening therein, means including a movable panel associated with an edge of the window opening for changing the size of the window opening by an amount substantially equal to the width of the panel.

14. In a motor vehicle body structure, inner and outer side walls having a window opening therethrough, movable walls associated with said side walls and adapted to be swung into or out of the lower portion of the window opening and to extend in a plane parallel with the fixed side walls in either position.

MILTON TIBBETTS.